Feb. 24, 1925.

E. F. GRAY

DIRIGIBLE HEADLIGHT

Filed Feb. 26, 1923 2 Sheets-Sheet 1

1,527,253

E. F. Gray INVENTOR
BY Victor J. Evans
ATTORNEY

WITNESS:

Feb. 24, 1925.
E. F. GRAY
DIRIGIBLE HEADLIGHT
Filed Feb. 26, 1923
1,527,253
2 Sheets-Sheet 2
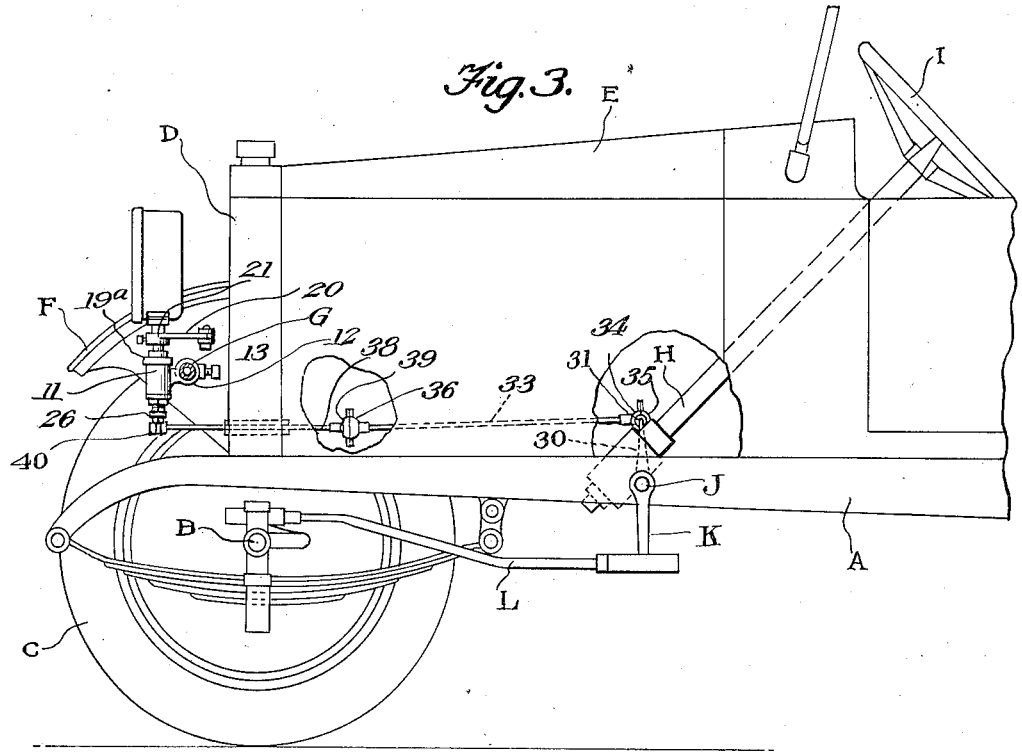
E. F. Gray
INVENTOR
BY Victor J. Evans
ATTORNEY
WITNESS:

Patented Feb. 24, 1925.

1,527,253

UNITED STATES PATENT OFFICE.

EDWARD F. GRAY, OF BIG SPRING, TEXAS.

DIRIGIBLE HEADLIGHT.

Application filed February 26, 1923. Serial No. 621,276.

*To all whom it may concern:*

Be it known that I, EDWARD F. GRAY, a citizen of the United States, residing at Big Spring, in the county of Howard and State of Texas, have invented new and useful Improvements in Dirigible Headlights, of which the following is a specification.

This invention relates to headlight mountings for automobiles and has for its object the provision of a novel headlight mounting and operating means therefor so that the lamps will be turned automatically as the front wheels of the vehicle are turned when rounding corners and the like, the advantage being that the light from the lamps will always be projected onto the road way in advance of the vehicle.

An important object is the provision of a dirigible headlight construction associated with the new type of headlamp mounting in which the lamps are carried by a rod which extends transversely of the vehicle in advance of the radiator and which is secured to the fenders for bracing the same.

Another object is the provision of operating means which is designed to be clamped or secured upon the steering post so that when the steering wheel is turned the headlamps will be correspondingly turned.

An additional object is the provision of a device of this character which will be simple and inexpensive in manufacture, highly efficient in use, durable in service and a general improvement in the art.

Figure 1:
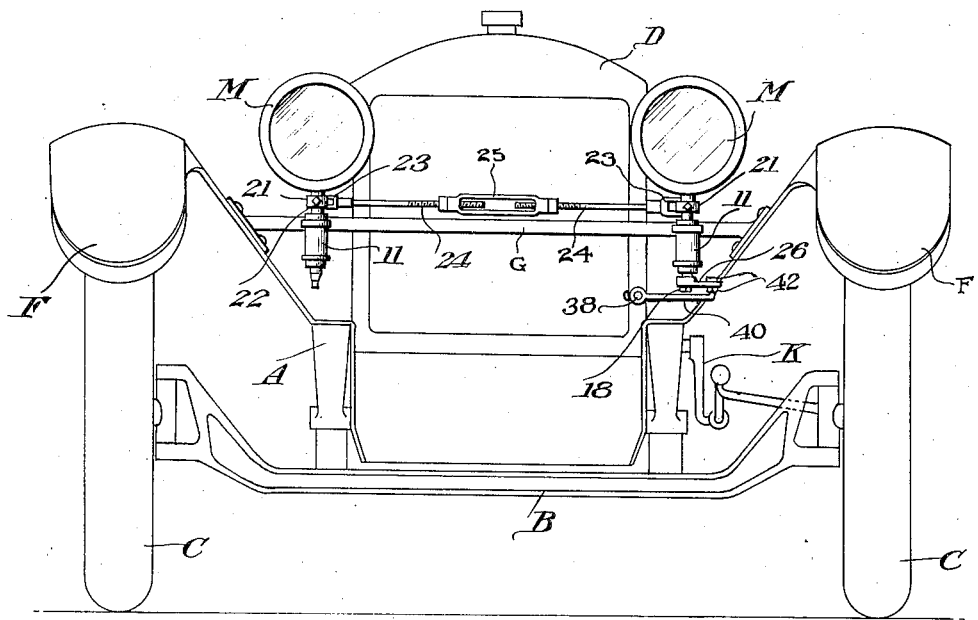
Figure 2:
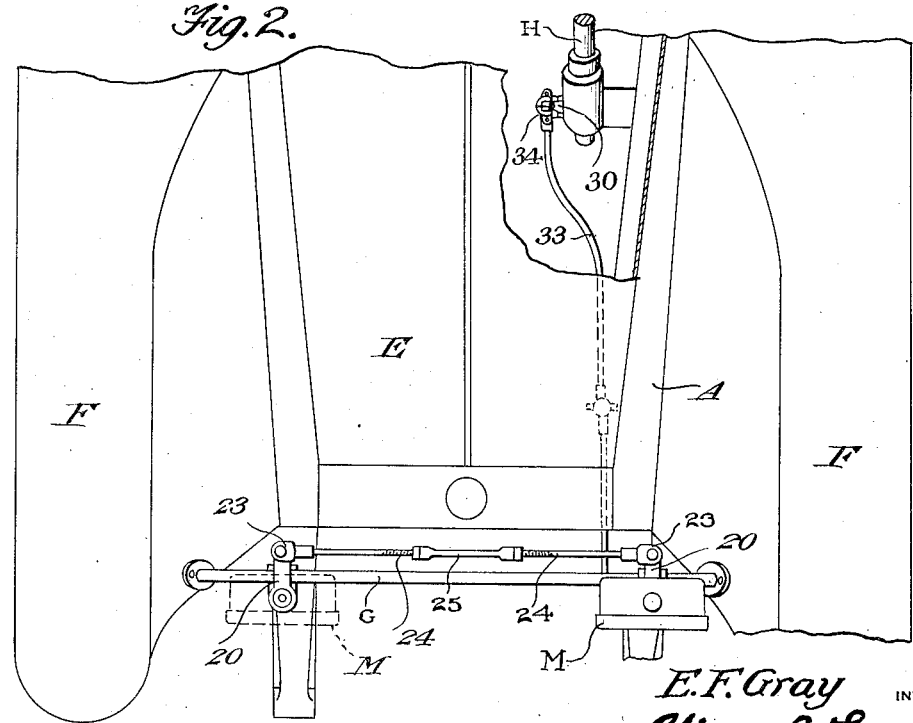

With the above and other objects and advantages in view the invention consists in the details of construction to be hereinafter more fully described and claimed and illustrated in the accompanying drawings, in which:

Figure 1 is a front elevation of an automobile showing the application of my invention, Figure 2 is a plan view with a portion broken away to disclose the operating means, Figure 3 is a side elevation with a portion broken away, Figure 4 is a detail vertical section showing the mounting for the lamps and Figure 5 is a detail perspective view showing the elements of the operating rod disconnected.

Referring more particularly to the drawings the letter A designates the frame of an automobile, B the front axle carrying wheels C, D represents the radiator, E the hood, F the fenders and G the transverse rod which is secured at its ends to the fenders and which extends in advance of the radiator. The letter H represents the steering column or rod which is turned when the steering wheel I is turned and which operates to rock the shaft J carrying the arm K to which is connected the rod L. The above are well known parts provided for steering of the vehicle.

In carrying out my invention the headlamps M are provided with depending stems 10 which are journaled through brackets 11 carried by the rod G. These brackets are shown as provided at their rear sides with sleeve portions 12 through which the rod G passes and these sleeve portions carry set screws 13 which hold the brackets in position and which permit the lamps to be tilted to any extent desired. Each bracket 11 is formed with a bore 14 leading into chambered out portions 15 at the ends and located within these chambered out portions are roller bearings 16 within which are engaged cones 17 here illustrated as screwed onto the stem 10. The lower ends of the stems carry nuts 18 and screwed onto the stems are collars or washers 19 which prevent the stem from slipping in either direction and one of which also serves to hold in place dust caps 19$^a$ which exclude dust and dirt from the interior of the bracket and the bearings. In this way it will be seen that the headlamps are rotatably mounted.

Carried by the stems 10 between the lamps and the brackets are arms 20 having hub portions 21 encircling the stems and held in adjusted position thereon by set screws 22 or the like. These arms have connected therewith the forked ends 23 of rods 24 which have their inner ends connected by a turn buckle 25 by means of which suitable adjustment may be made so that both lamps will face ordinarily in a straight ahead position. In addition to this, the lower end of one stem 10 has secured thereon an arm 26 having a hub portion 27 engaged upon the stem and held by the nut 18. The arm 26 has its end formed with a hole.

The operating means for the lamps consists of an arm 30 having one end terminating in a ball head 31 and having its other end suitably formed to be secured upon the shaft J of the steering mechanism. I also provide a rod 33 terminating at one end in a socket 34 engaged upon the ball head 31 and held by a cap 35. At its other end this rod 33 terminates in a socket 36 receiving a ball head 37 on one end of a rod 38 which ball head is held by a cap 39. The rod 38 has its other end carrying an arm 40 provided with a threaded finger 41 engaged within the hole in the arm 26 and held by nuts 42.

In the operation it will be seen that when the steering wheel I is turned to effect steering, the rocking of the shaft J will cause the arm 30 to move the flexibly connected rods 33 and 38 and consequently the arm 26 carried by one headlamp stem. As both headlamps are connected by the rods 24 it is apparent that the other one will also be moved correspondingly. In this way it is quite evident that the lamps will be turned to accord with steering so that the light will always be thrown upon the road way regardless of whether the vehicle be traveling straight ahead or whether it be making a turn.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In a headlamp mounting including a rod extending across the front of a vehicle with its ends secured to the front fenders, a bracket including a sleeve portion rotatably adjustably mounted upon said rod, said bracket further including a body having a vertical bore and chambers at the ends thereof, a headlamp having a stem rotatably mounted through the bore, tapered roller bearings within said chambers, cones threaded onto the stem within the chambers and engaging within said bearings, a dust cap engaging over the upper end of the body and over the top of the upper cone, a retaining nut screwed onto the stem and engaging upon the top of the dust cap, a washer on the stem beneath and bearing against the lower cone, a retaining nut screwed onto the stem and engaging said washer, and means connected with the stem for effecting rotation thereof.

In testimony whereof I affix my signature.

EDWARD F. GRAY.